(12) United States Patent
Rosman et al.

(10) Patent No.: US 8,158,897 B2
(45) Date of Patent: Apr. 17, 2012

(54) ACTUATING DEVICE ON A VEHICLE STEERING WHEEL

(75) Inventors: Bojan Rosman, Stuttgart (DE); Norbert Schote, Ammerbuch (DE)

(73) Assignee: Dr. Ing. H.c. F. Porsche Aktiengesellschaft, Stuttgart (DE)

( * ) Notice: Subject to any disclaimer, the term of this patent is extended or adjusted under 35 U.S.C. 154(b) by 951 days.

(21) Appl. No.: 12/169,007

(22) Filed: Jul. 8, 2008

(65) Prior Publication Data

US 2009/0014294 A1 Jan. 15, 2009

(30) Foreign Application Priority Data

Jul. 13, 2007 (DE) .......................... 10 2007 032 657

(51) Int. Cl.
*H01H 9/06* (2006.01)
(52) U.S. Cl. ................................. 200/61.88; 200/61.54
(58) Field of Classification Search ................ 200/61.88
See application file for complete search history.

(56) References Cited

U.S. PATENT DOCUMENTS

| 6,501,035 | B2 * | 12/2002 | Takahashi ................. 200/61.54 |
| 6,586,692 | B2 | 7/2003 | Agetsuma |
| 7,441,800 | B2 * | 10/2008 | Weber et al. .................. 280/731 |
| 7,762,159 | B2 | 7/2010 | Takahashi et al. |
| 2001/0002646 | A1 | 6/2001 | Leng |

FOREIGN PATENT DOCUMENTS

| DE | 9320309 U1 | 3/1994 |
| DE | 19718979 A1 | 11/1998 |
| DE | 10253462 A1 | 5/2004 |
| DE | 102004026243 B3 | 1/2006 |
| EP | 0 941 886 B1 | 9/1999 |
| EP | 1211119 A2 | 6/2002 |
| EP | 1394829 A2 | 3/2004 |

\* cited by examiner

*Primary Examiner* — Renee Luebke
*Assistant Examiner* — Lheiren Mae Caroc

(57) ABSTRACT

An actuating device on a vehicle steering wheel includes two shifting buttons which are disposed on an upper side and a lower side of the steering wheel. The shifting buttons are guided together rectilinearly on guide pins during a shifting operation. The guide pins are held in sleeves of a supporting plate and are fastened to a steering wheel cover.

15 Claims, 4 Drawing Sheets

ACTUATING DEVICE ON A VEHICLE STEERING WHEEL

CROSS-REFERENCE TO RELATED APPLICATION

This application claims the priority, under 35 U.S.C. §119, of German Patent Application DE 10 2007 032 657.4, filed Jul. 13, 2007; the prior application is herewith incorporated by reference in its entirety.

BACKGROUND OF THE INVENTION

Field of the Invention

The invention relates to an actuating device on a vehicle steering wheel, in particular for shifting a dual clutch transmission, having a shifting device on each of a front side and a rear side of the vehicle steering wheel.

European Patent EP 0 941 886 B1 has disclosed an actuating device for a vehicle transmission on a steering wheel of a motor vehicle. In that actuating device, a shifting device for shifting the transmission is disposed on a front side and a further shifting device is disposed on a rear side of the steering wheel.

SUMMARY OF THE INVENTION

It is accordingly an object of the invention to provide an actuating device on a vehicle steering wheel for a vehicle transmission, in particular for a dual clutch transmission, which overcomes the hereinafore-mentioned disadvantages of the heretofore-known devices of this general type, which ensures optimum operation on the steering wheel and which additionally ensures a construction with low mounting expenditure.

With the foregoing and other objects in view there is provided, in accordance with the invention, an actuating device on a vehicle steering wheel, in particular for shifting a dual clutch transmission. The actuating device comprises two mutually opposite shifting buttons each disposed on a respective one of a front side and a rear side of the vehicle steering wheel and each having at least one housing half. A stationary supporting plate is provided. Guide pins interconnect the shifting buttons and mount the shifting buttons in the stationary supporting plate for adjusting both of the shifting buttons jointly for shifting.

The advantages which are mainly achieved with the invention include the fact that an actuating device is produced from two assembled housing halves which at the same time form so-called shifting buttons that act on electric shifting elements, and a dual clutch transmission can therefore be actuated. There is provision according to the invention, in particular, for the actuating device to include two shifting buttons which are connected to one another through guide pins, are disposed opposite one another, are formed in each case from at least one housing half and are mounted through the guide pins in a stationary supporting plate in such a way that both shifting buttons can be adjusted jointly at least for shifting. As a result of this configuration of the actuating device, pressure exertion on the shifting buttons achieves a rectilinear movement and therefore brings about a shifting operation of the dual clutch transmission.

In accordance with another feature of the invention, the electric or electronic shifting elements for shifting the dual clutch transmission include so-called elastically resilient shifting mats which are disposed opposite electric shifting elements on the supporting plate.

In accordance with a further feature of the invention, in order to ensure that a rectilinear movement of the two shifting buttons is ensured, the guide pins are disposed displaceably with their free ends in each case in sleeve-like receptacles of the housing halves and in the central region in each case in a sleeve of the supporting plate, together with the housing halves. This ensures guiding of the shifting buttons, even if pressure is exerted on different surface regions of the shifting buttons.

In accordance with an added feature of the invention, in order to ensure that jamming of the shifting buttons is counteracted, one of the guide pins is mounted in a brass bush or bushing which has a defined length and is inserted into the sleeve or in a bush having a linear ball bearing and the further guide pin is mounted in a slotted receptacle of the sleeve. Moreover, the brass bush brings about a satisfactory sliding property having low friction. This achieves a situation where the guide pin in the brass bush assumes the function of main guidance and the further guide pin assumes the function of an antirotation safeguard. A plastic bush is also conceivable instead of the brass bush.

In accordance with an additional feature of the invention, the shifting button on the upper side of the steering wheel can be configured for an upshift or downshift of the dual clutch transmission and the shifting button which is disposed below it can be configured for a downshift or upshift. That is to say, the structure of the shifting buttons can be configured in such a way that the upper shifting button is configured for a downshift and the lower shifting button is configured for an upshift or vice versa.

In accordance with a concomitant feature of the invention, there is provision for the upper shifting button to be inserted into a U-shaped recess of the steering wheel cover and to be configured congruently with an edge region of the steering wheel cover, and for an adjoining face region to be configured so as to fall away obliquely and for an exposed region of the shifting button which is not enclosed by the recess to protrude freely in front of the steering wheel cover, which region is guided together with a corresponding region of the lower shifting button. This achieves an upper shifting button which is adapted virtually congruently to the steering wheel cover, which ensures satisfactory operability. The surface regions of both the upper and lower shifting buttons are constructed haptically in such a way that optimum operability is ensured in every position of the steering wheel.

Other features which are considered as characteristic for the invention are set forth in the appended claims.

Although the invention is illustrated and described herein as embodied in an actuating device on a vehicle steering wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
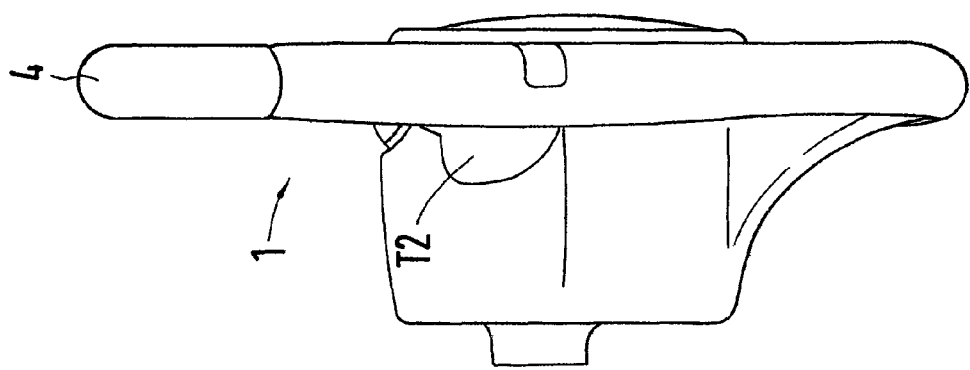
FIG. 2 is a side-elevational view of the steering wheel, as seen in the direction of an arrow Z.
Figure 1:
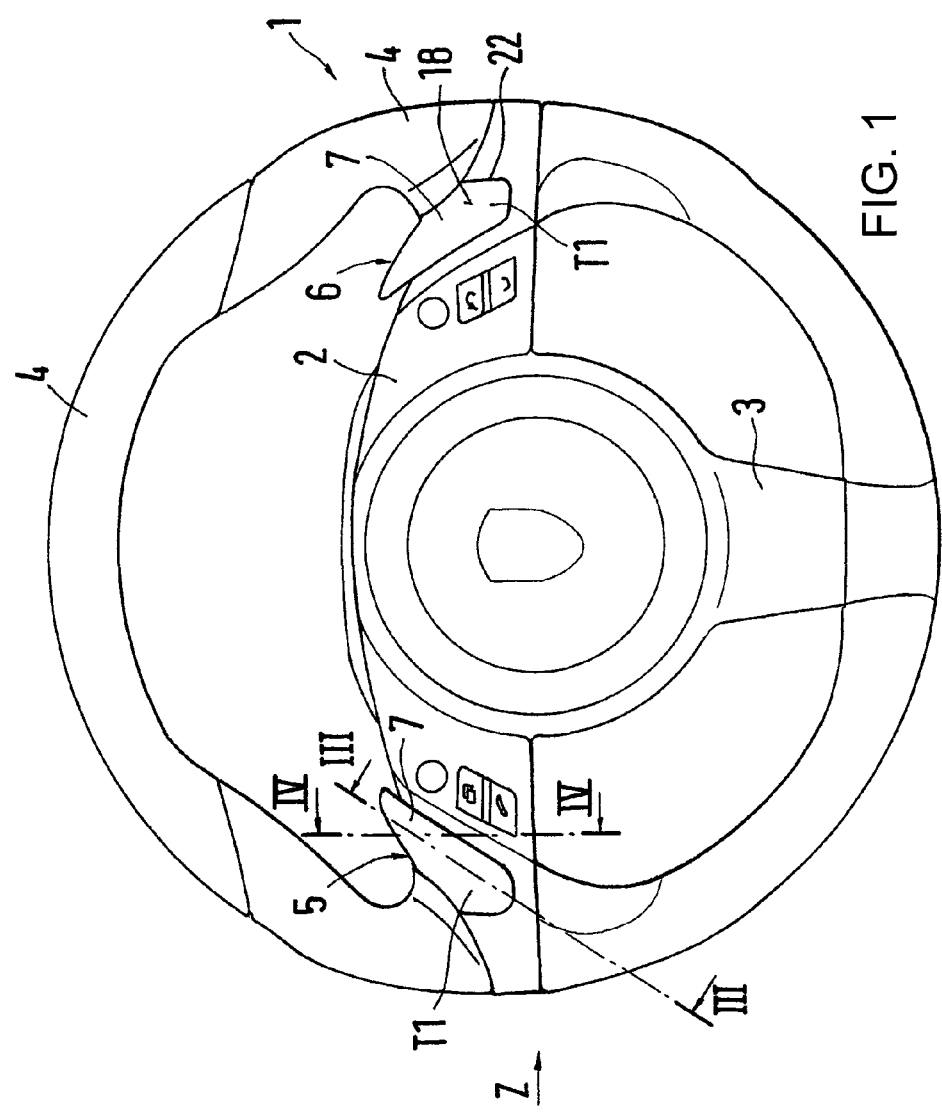
FIG. 1 is a diagrammatic, front-elevational view of a steering wheel having actuating devices.

Referring now to the figures of the drawings in detail and first, particularly, to FIG. 1 thereof, there is seen a steering wheel cover 3 which is fixed to a steering wheel 1. The steering wheel cover 3 has an actuating device 5, 6 on each side in a transverse web 2 close to a steering wheel rim 4, for shifting a dual clutch transmission, for example.

It is seen with reference to FIGS. 1-5 that the actuating devices 5, 6 include at least two housing halves 7, 8 which are configured as so-called shifting buttons T1 and T2 having haptic actuating faces F1 and F2. The housing halves 7, 8 are connected to one another through guide pins 9, 10 which are held displaceably in guide sleeves 11, 12 of a supporting plate 13. The guide pins 9, 10 are each held at their ends in a firmly inserted manner in a respective integrally formed or one-piece inner sleeve-like receptacle 14, 15 of the housing halves 7, 8. Spacings a and b, which permit shifting movements, are provided between free ends of the housing receptacles 14, 15 and the guide sleeves 11, 12 of the supporting plate 13.

One guide pin or journal 9 is mounted in a brass bush 21 or in a bush which is coated with brass in the sleeve 12, as a result of which improved smooth running is achieved during the actuation of the shifting buttons T1 and T2. The length of the brass bush 21 defines nonjamming of the guide pin 9 in the bush 21. The other guide pin or journal 10 can be displaced in the sleeve 12 of the supporting plate 13 within a slot, as a result of which a play is achieved and jamming is avoided. A sleeve having an inner linear ball bearing can also be used instead of the brass bush 21.

Figure 3:
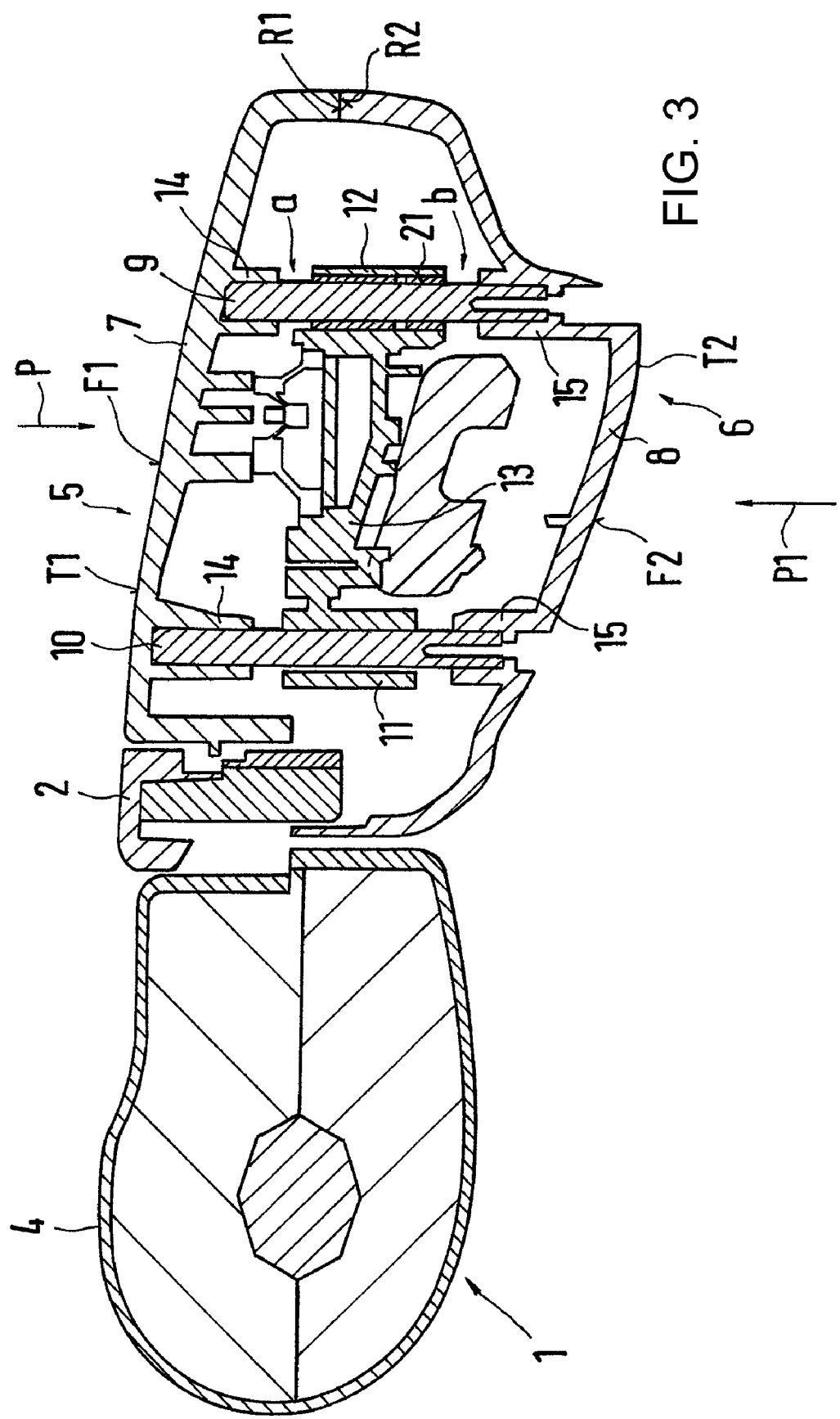
FIG. 3 is an enlarged, cross-sectional view taken along a line III-III of FIG. 1, in the direction of the arrows.
Figure 4:
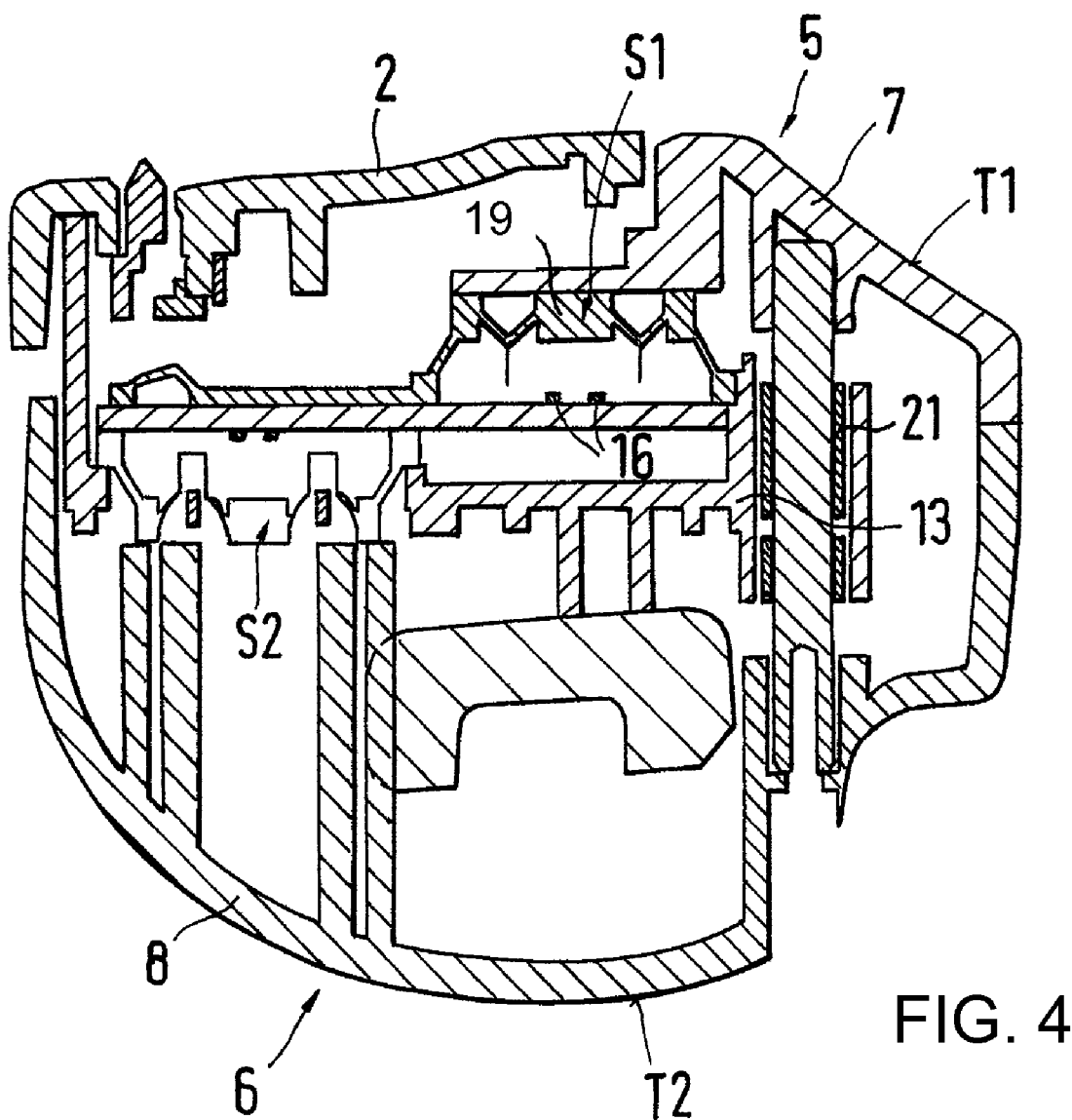
FIG. 4 is a cross-sectional view taken along a line IV-IV of FIG. 1, in the direction of the arrows.
Figure 5:
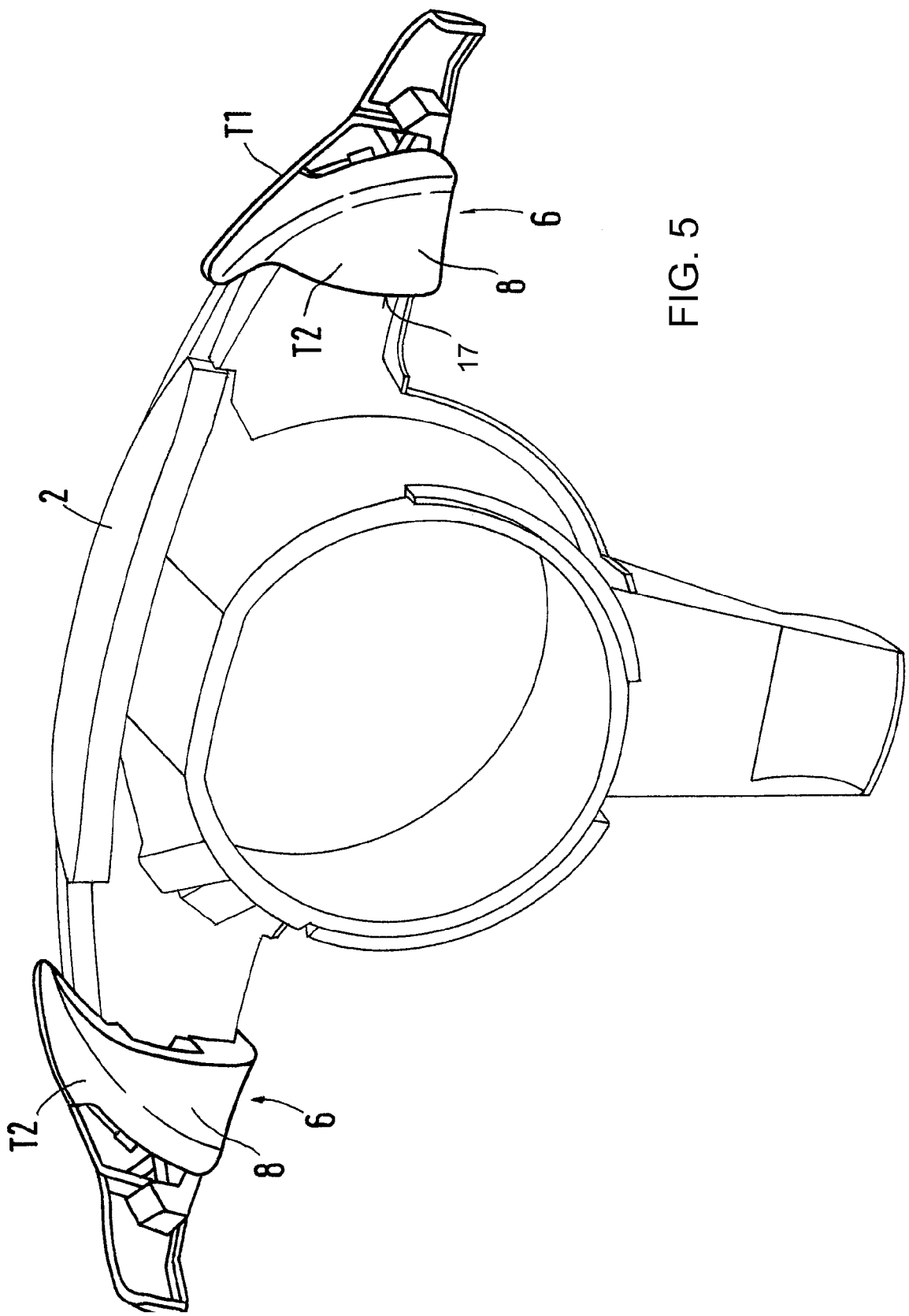
FIG. 5 is a rear-elevational view of a steering wheel cover having a connected supporting plate and actuating devices.

The two housing halves 7, 8 lie on one another in a supporting manner in an edge region R1 and R2 and are held through elastic shifting mats S1 and S2 in a so-called neutral position, in which the spacings a and b prevail, as shown in greater detail in FIGS. 3 and 4.

During an actuation of the upper shifting button T1 for an upshift of the dual clutch transmission by pressure actuation in the direction of an arrow P, a contact block 19 of an elastic shifting mat is pressed against electric contacts 16. During an actuation of the lower shifting button T2 in the direction of an arrow P1, an identical process takes place as in the case of the upper shifting button T1. In every case, the two housing halves 7 and 8, which form the shifting buttons T1 and T2, are guided jointly by the guide pins 9, 10 in a rectilinear movement in the sleeves 11, 12 of the supporting plate 13 during an actuation of one shifting button T1 or T2.

The housing halves 7, 8 are disposed in a U-shaped recess 22 of the steering wheel cover 3, with an edge region 17 of the housing half 5 or the upper shifting button T1 being disposed congruently with the steering wheel cover 3. In contrast, an adjoining face region 18 is configured so as to fall away obliquely. A front region of the shifting button T1 and T2 is exposed, is not enclosed by the recess 22, is disposed so as to protrude freely in front of the steering wheel cover 3 and is guided together with a corresponding region of the lower shifting button T2. The surfaces of the shifting buttons T1 and T2 are configured as haptic operating faces.

The invention claimed is:

1. An actuating device on a vehicle steering wheel, the actuating device comprising:

two mutually opposite shifting buttons each disposed on a respective one of a front side and a rear side of the vehicle steering wheel and each having at least one housing half;

a stationary supporting plate; and guide pins interconnecting said shifting buttons and mounting said shifting buttons in said stationary supporting plate for adjusting both of said shifting buttons jointly for shifting, upon actuation of said shifting buttons, said shifting buttons being guided by said guide pins and said guide pins moving simultaneously with said shifting buttons due to the actuation.

2. The actuating device according to claim 1, which further comprises electric shifting elements, said shifting buttons each lying opposite respective said electric shifting elements for shifting transmission stages of a dual clutch transmission.

3. The actuating device according to claim 2, which further comprises an elastically resilient shifting mat having a contact face, said stationary supporting plate being disposed so as to correspond to said elastically resilient shifting mat, and said electric shifting elements being connected to said stationary supporting plate.

4. The actuating device according to claim 1, wherein said two shifting buttons are adjustable jointly relative to said supporting plate through said guide pins.

5. The actuating device according to claim 1, wherein said two shifting buttons are upper and lower shifting buttons, said upper shifting button is configured for an upshift or downshift of a dual clutch transmission and said lower shifting button is configured for a downshift or upshift of the dual clutch transmission.

6. The actuating device according to claim 5, which further comprises a steering wheel cover, said upper shifting button being inserted into a U-shaped recess of said steering wheel cover, being configured congruently with an edge region of said steering wheel cover and having an adjoining face region being configured to fall away obliquely, said upper shifting button having an exposed region not enclosed by said recess and protruding freely in front of said steering wheel cover, and said region being guided together with a corresponding region of said lower shifting button.

7. The actuating device according to claim 6, wherein said falling away adjoining face region is configured as a haptic bearing face for a finger of an operator.

8. The actuating device according to claim 5, wherein said lower shifting button is recessed in said steering wheel and has a haptic bearing face for a finger of an operator.

9. The actuating device according to claim 5, which further comprises a steering wheel spoke, said lower shifting button being recessed in said steering wheel spoke and having a haptic bearing face for a finger of an operator.

10. The actuating device according to claim 1, wherein said upper shifting button and said lower shifting button together form a housing-like structural unit having opposite edges supported on each other on at least one side.

11. An actuating device on a vehicle steering wheel, the actuating device comprising:

two mutually opposite shifting buttons each disposed on a respective one of a front side and a rear side of the vehicle steering wheel and each having at least one housing half with a sleeve-like receptacle;

a stationary supporting plate having sleeves; and guide pins interconnecting said shifting buttons and mounting said shifting buttons in said stationary supporting plate for adjusting both of said shifting buttons jointly for shifting, and said guide pins having free ends each disposed in a respective one of said sleeve-like receptacles and a central region each disposed in a respective one of said sleeves, for displacement together with said housing halves.

12. The actuating device according to claim 11, which further comprises a brass bush inserted into one of said sleeves, and a slotted receptacle formed in another of said sleeves, one of said guide pins being mounted displaceably in said brass bush and another of said guide pins being mounted displaceably in said slotted receptacle.

13. The actuating device according to claim 11, wherein said shifting buttons perform a common rectilinear shifting movement under exertion of pressure by said pins guided in said sleeves of said supporting plate.

14. The actuating device according to claim 11, which further comprises a steering wheel cover having an inside, and a fastening device holding said supporting plate on said inside of said steering wheel cover together with said sleeves for said guide pins.

15. The actuating device according to claim 11, wherein at least one of said guide pins is made from stainless steel or has a hard surface and is guided in at least one of said sleeves with an inner linear ball bearing.

\* \* \* \* \*